Oct. 28, 1924.
N. C. RENDLEMAN
SHEARING OF ELONGATE MATERIAL
Filed March 27, 1924   2 Sheets-Sheet 1
1,513,070
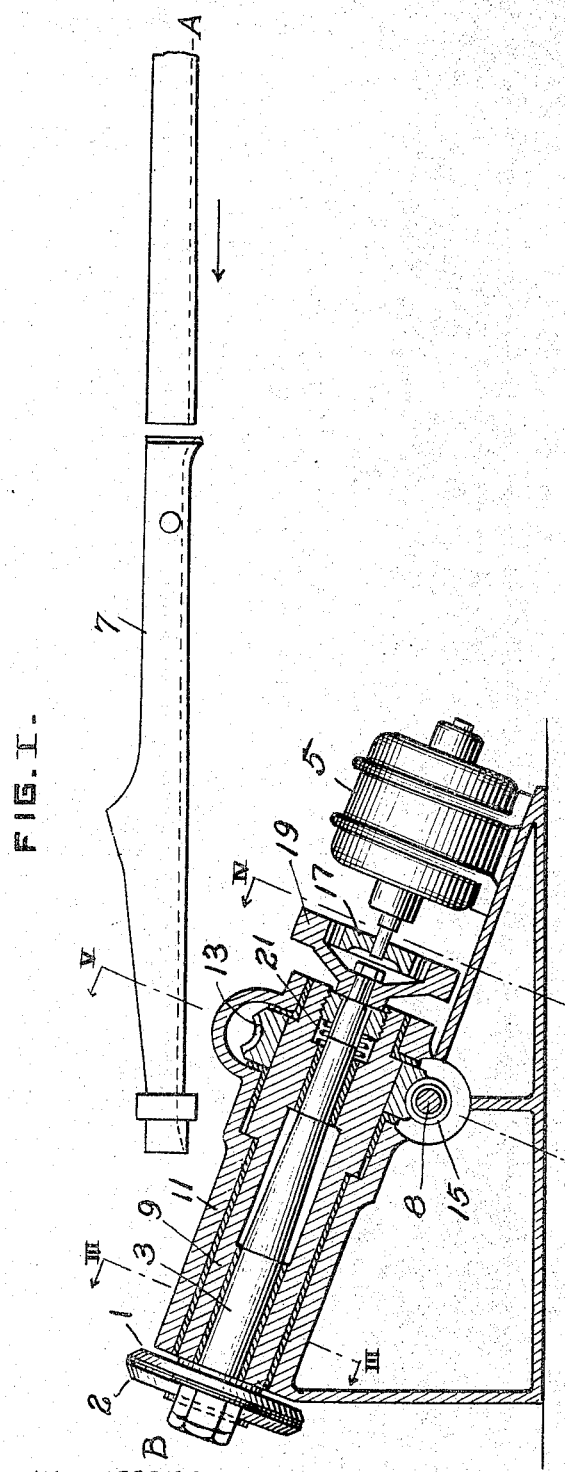
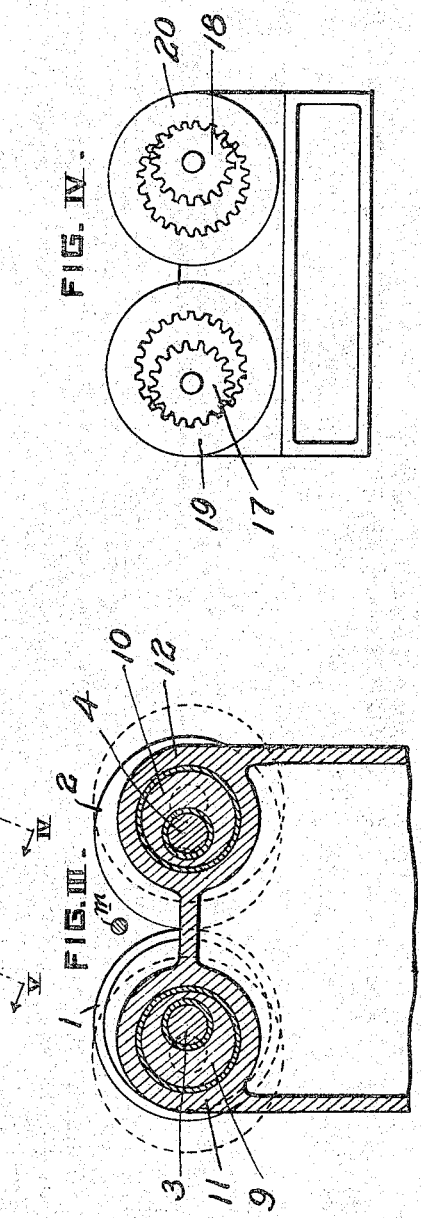
INVENTOR
Norman C. Rendleman
by Christy and Christy
his attorneys Oct. 28, 1924.
N. C. RENDLEMAN
SHEARING OF ELONGATE MATERIAL
Filed March 27, 1924
1,513,070
2 Sheets-Sheet 2
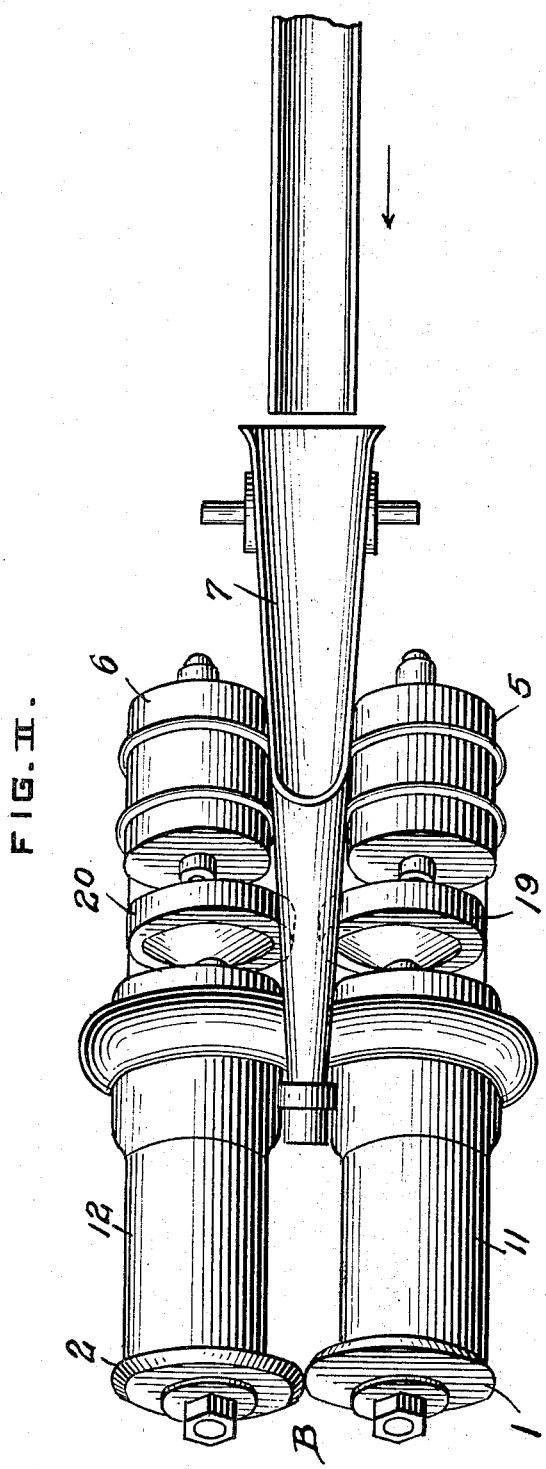
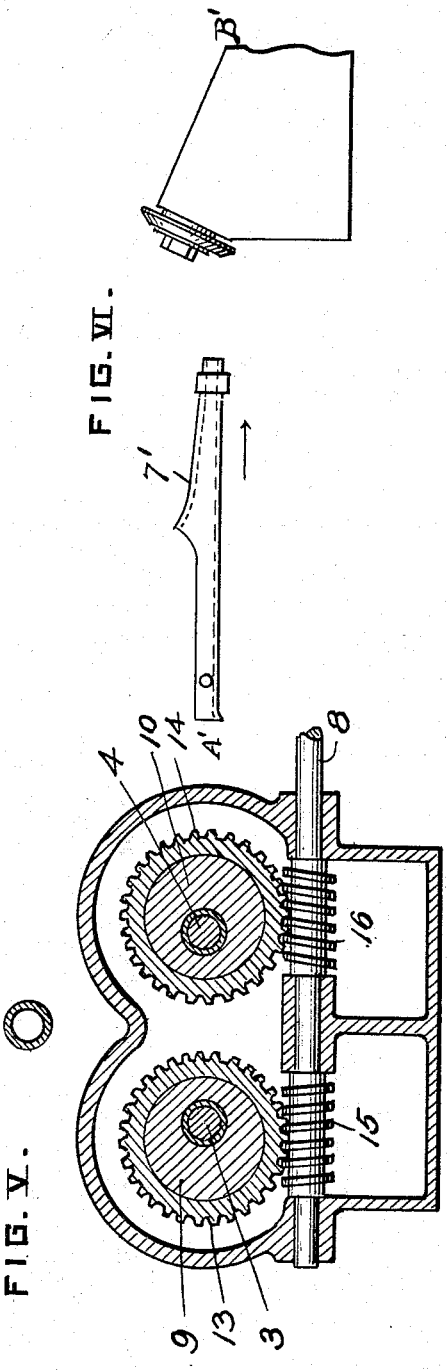
WITNESSES
INVENTOR
Norman C. Rendleman
by Christy and Christy
his attorneys Patented Oct. 28, 1924.

1,513,070

UNITED STATES PATENT OFFICE.

NORMAN C. RENDLEMAN, OF DORMONT, PENNSYLVANIA.

SHEARING OF ELONGATE MATERIAL.

Application filed March 27, 1924. Serial No. 702,212.

*To all whom it may concern:*

Be it known that I, NORMAN C. RENDLEMAN, residing at Dormont, in the county of Allegheny and State of Pennsylvania, a citizen of the United States, have invented or discovered certain new and useful Improvements in the Shearing of Elongate Material, of which improvements the following is a specification.

My invention relates to the shearing of elongate material. I have developed it in the shearing to length of rolled articles of steel, such as rods, bars, and strips, which are commonly produced in pieces of great linear extent, and in such application I shall describe it. The invention, however, is applicable generally, where similar conditions obtain and a like result is desired. In rolling-mill operation and in the production of articles of the character indicated, the material is enormously elongated. It is a matter of economy, for other reasons and in order to save floor space as well, to shear to lengths the rolled product as it comes hot from the final roll-pass, to lie upon the cooling bed prepared for its reception. It is with the performance of that shearing operation that the invention as I have developed it has to do. The invention is found both in method and in apparatus by which the method is carried out.

In the accompanying drawings Fig. I is a view partly in side elevation, partly in vertical section, of apparatus in which and in the operation of which my invention is found; Fig. II is a view of the same apparatus in plan, as seen from above; Figs. III, IV, and V are views in section, on the planes indicated respectively by the lines III—III, IV—IV, and V—V, Fig. I; Fig. VI is a view in side elevation, and drawn to smaller scale, and illustrating a modification in structure and in method of operation.

I shall first describe the apparatus of Figs. I-V. A pair of shears of rotating disk type, 1 and 2, are mounted for rotation upon stems 3 and 4, and means of rotation are provided in motors 5 and 6. These disks so carried and so driven are with their associated parts so mounted that the plane (or substantial plane) in which they cooperate to effect cutting is inclined from the vertical (conveniently at an angle of 20°, more or less, as shown), while the line passing through their centers of turning and bisecting the "bite" formed by and between them is a horizontal line. Conveniently the disks are carried as shown at the upper end of their inclined stems, and the motor drive connection is at the lower end, and the stems are of such length that the motors and the associated parts still to be described are out of the way. In Fig. I the line of normal travel of the material to be sheared is indicated at A—B, and the direction of travel is indicated by an arrow; in Fig. III the position of the material is indicated at *m*, and it will be perceived that the disks placed as described are so arranged relatively to the advancing material that the bite formed by and between them is disposed adjacent and vertically beneath the pathway of normal advance of the material.

Adjacent the shear and on the side toward the mill, that is to say, the side from which the material advances, is set a vertically swinging guide 7. Through it the material advances. Swinging of this guide downward from the position shown in Fig. I will cause the advancing length of material to be deflected from its normal path in a bow, which bow will traverse vertically from above downward the bite formed by and between the shear disks 1 and 2. Subsequent swinging of the guide upward will cause the advancing length of material to rise until the bow is eliminated and the material is advancing upon its normal pathway again.

Means are provided for causing the cooperating shear disks to advance and recede on the plane of shearing, between positions of cooperation in which cutting is effected to positions of relative remoteness, when space is left between the disks to allow the material to rise vertically between free of engagement by the disks. Fig. III shows in full lines the disks in cooperating and cutting positions and in dotted lines in remote and open positions. Suitable means for effecting periodically such relative advance and retreat of the shear disks consist of rotary cylindrical blocks 9 and 10 through which extend longitudinally eccentrically placed bores in which the disk stems 3 and 4 are rotatably carried, and in means for rotating these cylindrical blocks on their axes. The blocks 9 and 10 are rotatable within cylindrical casings 11 and 12. Exteriorly upon blocks 9 and 10 are formed pinions 13 and 14, and these pinions, which are equal in size and bilaterally shaped and arranged with respect to the vertical mid-plane of the machine are engaged by oppositely turned worms 15 and 16 borne upon a common shaft 8. It will be perceived that as shaft 8 rotates, blocks 9 and 10 rotate oppositely, and the disks being borne symmetrically in these blocks the disks themselves correspondingly move symmetrically through corresponding orbits in their common plane of cutting, and in so doing alternately close and open.

It is not desirable to carry the motors 5 and 6 through cycles of turning. They should be mounted immovably on a suitable foundation. Accordingly drive gearing is provided, whose character will be understood on comparing Figs. I and IV, whereby the circling disks may be constantly rotated from stationary motors. The motor shafts are provided with pinions 17 and 18 and the blocks 9 and 10 are provided with interiorly toothed pinions 19 and 20 of larger and of proper size. The parts are so placed that the tangential engagement of pinions 17 and 18 with pinions 19 and 20 is symmetrical, as Fig. IV shows it to be. As blocks 9 and 10 are rotated by shaft 8, the disks 1 and 2 continue in constant rotation by their motors 5 and 6.

It remains to remark, as is particularly shown in Fig. I, that the stems 3 and 4 of disks 1 and 2 have longitudinal movement within a narrow range within blocks 9 and 10 and that springs are provided, one of which is shown at 21, which tend to hold the disks constantly at the outer limit of their range of movement. It presently will appear that when the shear is in action and when the work is forcibly thrust upon the shear disks the downward give which this spring backing affords will relieve the strain.

The swinging of the guide 7 may, as will be perceived, be coordinated with the turning of shaft 8, to the end that the material shall be carried downward across the bite of the shears at a time when the disk blades are in relative positions for cutting, and shall be carried upward again at a time when the blades are relatively remote and the shear open.

Fig. III shows in full lines the cutting disks in substantial tangency, and, as has already been said the full-line position here is the cutting position. The disks when in cutting position will stand, when viewed as in Fig. III, in tangency or in substantial tangency, or in overlapped positions, the particular positions depending upon the nature and condition of the material to be cut. The position shown in Fig. III is suited to the cutting of steel rods as they come hot from the rolling mill.

Operation will readily be understood. Fig. III is to this extent schematic: The position of the material there indicated at $m$ is not the position which the material occupies when the shear disks are in the closed position shown. When the disks are in closed position the material is midway of its swing downward and is in engagement with the disks. With this qualification, the drawings are sufficiently illustrative.

When the guide 7 is in the position shown in Fig. I the material will be understood to be advancing along, or substantially along the line A—B. The shear will then be standing open. When cutting is to be effected the disks 1 and 2 are of course rotating, blocks 9 and 10 also rotate and guide 7 swings downward. Regarding the apparatus as shown in Fig. III, disk 1 turns clockwise and disk 2 anticlockwise, and blocks 9 and 10 are preferably so mounted and driven that block 9 turns clockwise and block 10 anticlockwise. By the turning of blocks 9 and 10 the rotating disks come from open position to cutting position and as they close the length of material is bowed by the swinging of guide 7 downward and the bow in its downward development is caused to traverse the bite of the shear disks. The angular setting of these shear disks brings it about that the advancing material is sheared square across or substantially so, and that without substantial disturbance of its powerful advance in the direction indicated by the arrow in Fig. I.

When thus a cut across the material has been effected, continued turning of blocks 9 and 10 causes the shear disks to recede and the shear to open, and as this occurs guide 7 may be swung upward again, eliminating the bow which had been developed in the length of advancing material and causing the material to resume its normal pathway. It then is in position for repetition of the operation.

It will be apparent that the mechanical parts described are adapted for coordinate operation, not with one another merely, but with the mill parts with which the shear is associated.

My invention in method is found in the operation of the machine which I now have described. Hitherto in the operation of shears of this general sort it has been the practice to swing the material laterally between disks rotating on vertically aligned centers. My invention here lies in the discovery that by aligning the disks horizontally and swinging the material vertically an objectionable twist given to the material in the operation as hitherto conducted, or suggested, does not develop. The vertical swing involves the provision of swinging means which shall take the weight of the material and at the same time be powerful to effect the desired swinging. My invention, therefore, requires the building of heavier swinging means than are required in the practice hitherto proposed and contemplated. And that earlier practice is the more obvious practice and one which an engineer naturally would adopt. My invention lies in the discovery that by the departure now described from what out of other considerations alone would be the normal and preferred practice, advantage may be gained, of such nature as I have indicated.

It remains to call attention to Fig. VI, there the arrangement is such that the line of normal advance A'—B' of the material lies beneath the bite between the shear disks, and the guide 7' is adapted to develop a bow in the advancing material not downwardly but upwardly.

I do not recommend, at least not for use in a steel mill, the combination of the arrangements severally shown in Figures I and VI, with the end in view of cutting the material as it advances both on its downward and on its upward swing. Manifestly if that combination were effected, it would be possible to eliminate the orbital movement of the cutting disks which has been described; it then would not be necessary to cause the shear disks to open and close again periodically. In spite of such simplification I do not recommend such arrangement, at least not for steel mill manufacture, for this reason: because the guides would then be required to direct the travelling material when bowed aside during all the interval from one time of cutting to the next, and the consequent wear upon the guides would be very great.

Manifestly the apparatus and method are applicable to the shearing of elongate material generally and of various sorts.

I claim as my invention:

1. The method herein described of shearing a length of material while advancing longitudinally, which consists in bringing the material and the shearing means into relative movement in vertical direction and transverse both to the line of advance of the material and to the plane in which the shear blades meet, and shearing while such relative movement is in progress.

2. The method herein described of shearing a length of material while advancing longitudinally, which consists in swinging the advancing material vertically and severing it laterally as it swings.

3. The method herein described of shearing a length of material while advancing longitudinally, which consists in swinging it vertically through the bite of a pair of disk shears cooperating in a plane oblique to the line of such longitudinal advance.

4. The method herein described of shearing a length of material while advancing longitudinally, which consists in deflecting the advancing material from its normal path and in a vertical plane into a bow and in developing such bow causing the material to pass through the bite of a pair of disk shears rotating on horizontally aligned centers and cooperating in a plane oblique to the line of such longitudinal advance of the material.

5. In the operation of a shear which includes a pair of periodically advancing and receding rotary shear blades mounted for rotation on horizontally aligned centers and cooperating in a plane oblique to the vertical, the method herein described of periodically severing a horizontally advancing length of material, which consists in periodically developing a bow in the material in vertical plane and in so doing causing the material to pass through the bite of the blades when in advanced positions, and allowing the previously developed bow to recede again when the shear blades have receded.

6. In apparatus for shearing a length of material while advancing longitudinally, the combination of shearing means, and means for establishing a condition of relative movement between the material under treatment and the shearing means in vertical direction and a direction transverse both to the line of advance of the material and to the plane in which the shear blades meet, the means last defined being adapted for operation while the shearing means are in action upon the material, substantially as described.

7. In apparatus for shearing a length of material while advancing longitudinally, the combination of means for swinging the advancing material vertically, and means for severing laterally the swinging material, the two means defined being adapted to operate simultaneously upon the material, substantially as described.

8. In apparatus for shearing a length of material while advancing longitudinally, the combination of a laterally acting shear set athwart the line of advance, and means for swinging the advancing material in vertical plane and transversely of the line of direction in which the shear blades meet.

9. In apparatus for shearing a length of material while advancing longitudinally, the combination of a pair of shear blades cooperating in a plane oblique to the line of advance of the material and means for swinging the advancing material in vertical plane across the bite of said shear blades.

10. In apparatus for shearing a length of material while advancing longitudinally, the combination of a pair of cutting disks rotating on horizontally aligned centers and cooperating in a plane oblique to the line of advance of the material to be sheared, and means for swinging the advancing material in vertical plane through the bite of said shear blades.

11. In apparatus for shearing a length of material while advancing longitudinally, the combination of a rotary-disk shear set obliquely adjacent the line of advance of the material, and means for effecting relative movement between shear and material, in vertical direction and a direction transverse to the line of advance of the material, substantially as described.

12. In apparatus for shearing a length of material while advancing longitudinally the combination of a pair of shear members adapted to advance and recede to and from relative positions of cooperation and means for swinging the material in a direction transverse to its line of advance and across the field of cooperation of the said shear members.

13. In apparatus for shearing a length of material while advancing longitudinally the combination of a pair of rotary blocks, a pair of rotary shear blades borne on spindles eccentrically carried by said blocks, the said shear blades adapted in the range of block rotation to cooperate in a plane oblique to the line of advance of the material, means for effecting rotation both of said blocks and of said shear blades, and means for swinging the advancing material across the field of cooperation of said shears.

In testimony whereof I have hereunto set my hand.

NORMAN C. RENDLEMAN.

Witnesses:
PERCY A. ENGLISH,
MARY A. WALL.